(12) United States Patent
Kohli et al.

(10) Patent No.: US 10,187,125 B2
(45) Date of Patent: Jan. 22, 2019

(54) HYBRID NODE

(71) Applicant: Facebook, Inc., Menlo Park, CA (US)

(72) Inventors: Sanjai Kohli, Manhattan Beach, CA (US); Djordje Tujkovic, Mountain View, CA (US); Krishna Gomadam, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/696,278

(22) Filed: Sep. 6, 2017

(65) Prior Publication Data

US 2018/0006686 A1 Jan. 4, 2018

Related U.S. Application Data

(63) Continuation of application No. 15/196,414, filed on Jun. 29, 2016, now Pat. No. 9,787,373.

(51) Int. Cl.
| | |
|---|---|
| *H04B 7/0408* | (2017.01) |
| *H04W 8/00* | (2009.01) |
| *H04B 1/10* | (2006.01) |
| *H04W 24/02* | (2009.01) |
| *H04B 7/06* | (2006.01) |
| *H04W 88/10* | (2009.01) |

(52) U.S. Cl.
CPC ......... *H04B 7/0408* (2013.01); *H04B 1/1027* (2013.01); *H04B 1/1036* (2013.01); *H04B 7/0617* (2013.01); *H04W 8/005* (2013.01); *H04W 24/02* (2013.01); *H04W 88/10* (2013.01)

(58) Field of Classification Search
CPC ..... H04W 24/02; H04W 8/005; H04W 88/10; H04B 7/0408; H04B 1/1027; H04B 1/1036
See application file for complete search history.

(56) References Cited

U.S. PATENT DOCUMENTS

| | | | |
|---|---|---|---|
| 3,364,484 A * | 1/1968 | Best | G01S 13/426 342/140 |
| 6,826,148 B1 | 11/2004 | Lee | |
| 9,215,644 B2 | 12/2015 | Kohli | |
| 9,277,480 B2 | 3/2016 | Kohli | |
| 2001/0036843 A1* | 11/2001 | Thompson | H01Q 1/246 455/562.1 |
| 2004/0146043 A1 | 7/2004 | Hiraoka et al. | |
| 2005/0283643 A1 | 12/2005 | Banerjee et al. | |
| 2006/0114818 A1 | 6/2006 | Canali et al. | |

(Continued)

*Primary Examiner* — Jean B Corrielus
(74) *Attorney, Agent, or Firm* — Brian R Short (57) ABSTRACT

Apparatuses, methods, and systems of a hybrid node are disclosed. One embodiment of the hybrid node includes a first sector and a second sector. The first sector is operative to transmit a signal through a predetermined transmission channel at each of a first plurality of transmit beam forming settings. The second sector is operative to receive the signal through the predetermined channel at a second plurality of receive beam forming settings for each of more than one of the first plurality of transmit beam forming settings. Further, the node is operative to measure a received signal quality of the received signal at each of the second plurality of receive beam forming settings of the second plurality of antenna elements, for each of the more than one of the first plurality of transmit beam forming settings of the first plurality of antenna elements.

20 Claims, 8 Drawing Sheets

(56) References Cited

U.S. PATENT DOCUMENTS

| | | |
|---|---|---|
| 2006/0146696 A1 | 7/2006 | Li et al. |
| 2007/0041347 A1 | 2/2007 | Beale et al. |
| 2007/0230639 A1 | 10/2007 | Stirling-Gallacher |
| 2008/0069034 A1 | 3/2008 | Buddhikot et al. |
| 2008/0090575 A1 | 4/2008 | Barak et al. |
| 2008/0248802 A1 | 10/2008 | Krishnamoorthy et al. |
| 2010/0080119 A1 | 4/2010 | Ansorge |
| 2010/0177664 A1 | 7/2010 | Thoumy et al. |
| 2011/0038253 A1 | 2/2011 | Yabusaki et al. |
| 2011/0045767 A1 | 2/2011 | Rofougaran et al. |
| 2011/0103503 A1 | 5/2011 | Shin et al. |
| 2011/0159821 A1 | 6/2011 | Park et al. |
| 2011/0223964 A1 | 9/2011 | Ebiko |
| 2012/0011365 A1 | 1/2012 | Schmidt et al. |
| 2012/0063447 A1 | 3/2012 | Tyrrell et al. |
| 2013/0089042 A1 | 4/2013 | Negus et al. |
| 2013/0128726 A1 | 5/2013 | Hellhake et al. |
| 2013/0176874 A1 | 7/2013 | Ku et al. |
| 2013/0201857 A1 | 8/2013 | Bhargava et al. |
| 2013/0301619 A1 | 11/2013 | Singh et al. |
| 2014/0074392 A1 | 3/2014 | Holm et al. |
| 2014/0086080 A1 | 3/2014 | Hui et al. |
| 2014/0204902 A1* | 7/2014 | Maltsev ............ H04W 36/0083 370/331 |
| 2014/0286156 A1 | 9/2014 | Kohli et al. |
| 2014/0286251 A1 | 9/2014 | Kohli et al. |
| 2015/0094025 A1 | 4/2015 | Chen |
| 2016/0028610 A1 | 2/2016 | Kohli et al. |
| 2016/0036500 A1 | 2/2016 | Kohli et al. |
| 2016/0037431 A1 | 2/2016 | Kohli et al. |
| 2016/0285522 A1* | 9/2016 | Kasher .................. H04B 7/043 |
| 2017/0079031 A1 | 3/2017 | Maltsev et al. |
| 2017/0188202 A1* | 6/2017 | Cariou .................. H04W 4/06 |
| 2017/0288769 A1 | 10/2017 | Miller et al. |
| 2017/0295595 A1 | 10/2017 | Yang |

* cited by examiner

FIG. 1

| Sector 1 Beam Setting | Sector 2 Beam Setting | Corresponding Peer Node Pairs | Received Signal Quality At T1 | Received Signal Quality At T2 | Received Signal Quality At T3 |
|---|---|---|---|---|---|
| 1 | 1 | P1, P2 | A | Z | Y |
| 1 | 2 | P1, P4 | B | B | B |
| 1 | ... | | | | |
| 1 | N | P1, P4 | D | D | D |
| 2 | 1 | P3, P5 | E | Y | Y |
| 2 | 2 | P3, P2 | F | F | F |
| 2 | ... | | | | |
| 2 | N | P3, P7 | G | H | F |
| ... | ... | | | | |
| M | 1 | None | No Value (Avoided) | No Value (Avoided) | No Value (Avoided) |
| M | 2 | None | No Value (Avoided) | No Value (Avoided) | No Value (Avoided) |
| M | ... | | | | |
| M | N | None | No Value (Avoided) | No Value (Avoided) | No Value (Avoided) |

Sector Independent Scheduling

| Time Slots | Sector 1 Transmit (Beam Setting) | Sector 2 Receive (Beam Setting) |
|---|---|---|
| 1 | 2 | 4 |
| 2 | 1 | 2 |
| 3 | 4 | 4 |
| . . | . . | . . |
| X | 1 | 2 |

Sector 1 Independently Schedules Transmission Beam Settings

Sector 2 Adaptively Schedules Receive Beam Settings to Avoid Select Combinations of Transmit and Receive Beam Forming and/or Favor Other Combinations of Transmit and Receive Beam Forming

Transmitting, by a first plurality of antenna elements of a first sector of an access node, a signal through a predetermined transmission channel at each of a first plurality of transmit beam forming settings of the first plurality of antenna elements

710

Receiving, by a second plurality of antenna elements of a second sector of the access node, the signal through the predetermined channel at a second plurality of receive beam forming settings of the second plurality of antenna elements, for each of more than one of the first plurality of transmit beam forming settings of the first plurality of antenna elements

720

Measuring a received signal quality of the received signal at each of the second plurality of receive beam forming settings of the second plurality of antenna elements, for each of the more than one of the first plurality of transmit beam forming settings of the first plurality of antenna elements

HYBRID NODE

RELATED APPLICATIONS

This patent application is a continuation of U.S. patent application Ser. No. 15/196,414 filed Jun. 29, 2016 and granted an U.S. Pat. No. 9,787,373 on Oct. 10, 2017, which is herein incorporated by reference.

FIELD OF THE DESCRIBED EMBODIMENTS

The described embodiments relate generally to wireless communications. More particularly, the described embodiments relate to systems, methods and apparatuses of a hybrid (transmit/receive) node of a communication system.

BACKGROUND

Wireless mesh networks include multiple nodes wherein wireless links are formed between the nodes. Typically, each node operates as a transmit node or as a receive node.

It is desirable to have methods apparatuses, and systems for a hybrid node of a wireless network, wherein the hybrid node simultaneously includes features of both a transmit node and a receive node.

SUMMARY

An embodiment includes a hybrid node. The hybrid node includes a first sector and a second sector. The first sector includes a first transceiver and a first plurality of antenna elements. The first sector is operative to transmit a signal through a predetermined transmission channel at each of a first plurality of transmit beam forming settings of the first plurality of antenna elements. The second sector includes a second transceiver and a second plurality of antenna elements. The second sector is operative to receive the signal through the predetermined channel at a second plurality of receive beam forming settings of the second plurality of antenna elements, for each of more than one of the first plurality of transmit beam forming settings of the first plurality of antenna elements.

Another embodiment includes a method of a hybrid node. The method includes transmitting, by a first plurality of antenna elements of a first sector of an access node, a signal through a predetermined transmission channel at each of a first plurality of transmit beam forming settings of the first plurality of antenna elements, receiving, by a second plurality of antenna elements of a second sector of the access node, the signal through the predetermined channel at a second plurality of receive beam forming settings of the second plurality of antenna elements, for each of more than one of the first plurality of transmit beam forming settings of the first plurality of antenna elements.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for a hybrid node. For at least some embodiments, the hybrid node is operative to simultaneously transmit signals through a transmission channel and receive other signals through the transmission channel. For an embodiment, the hybrid node includes multiple sectors, wherein at least one sector transmits a signal over a transmission channel and at least one other sector simultaneously receives a signal over the transmission channel. Hybrid nodes can advantageously be included within a wireless mesh network to improve the performance of the wireless mesh network. However, hybrid nodes suffer from self-interference due to the simultaneous transmission and reception of signals over a common transmission channel. At least some of the described embodiments include characterizing a hybrid node to enable improved simultaneous transmission and reception of the hybrid node through the common transmission channel.

Figure 1:
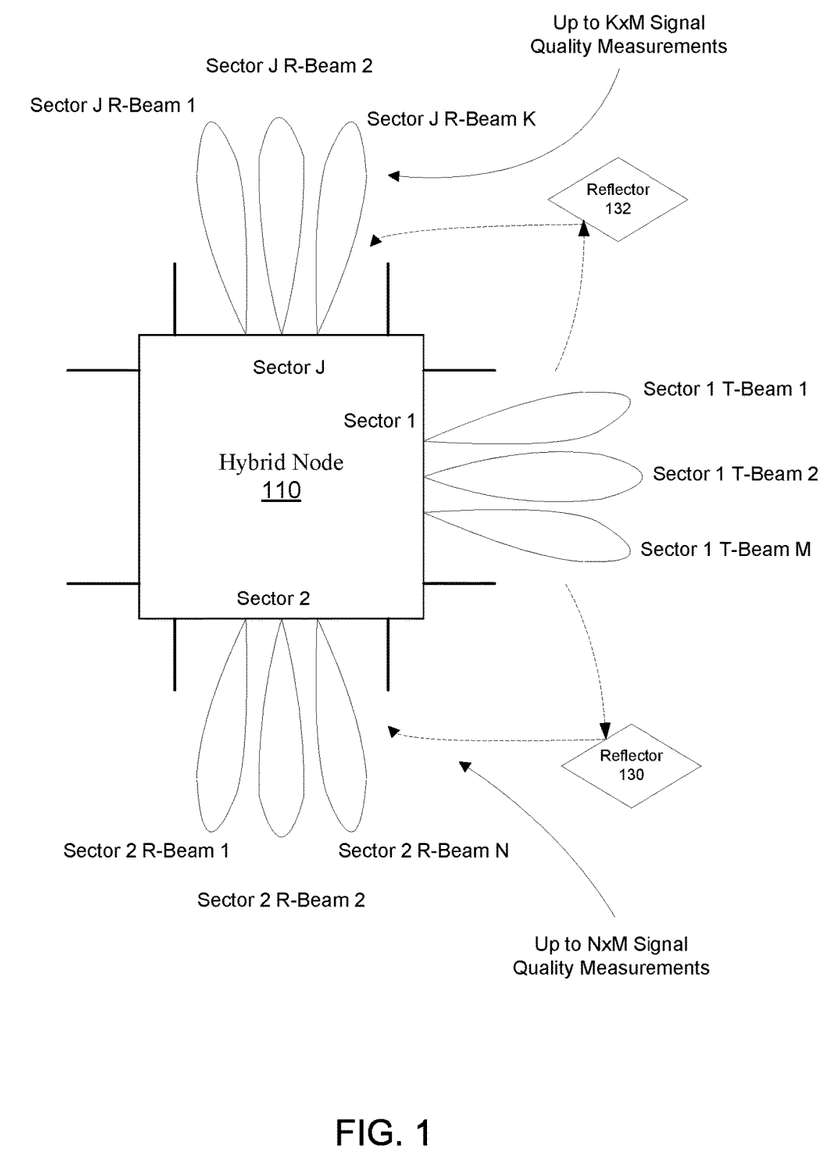
FIG. 1 shows a hybrid node, according to an embodiment.

FIG. 1 shows a hybrid node 110, according to an embodiment. The hybrid node 110 includes a first sector (sector 1) that includes an antenna array. The array of antennas of the first sector of the hybrid node 110 is operable to form a beam. For at least some embodiments, the array of antennas of the first sector includes M beam forming settings that direct the beam formed by the antenna array of the first sector to M different directions.

As shown, the hybrid node 110 can includes J sectors, including at least the first sector (sector 1) and a second sector (sector 2). Further, the second sector of the hybrid node 110 includes an antenna array which includes N settings that direct the beam formed by the antenna array of the second sector to N different directions.

As shown, Jth sector of the hybrid node 110 includes an antenna array which includes K settings that direct the beam formed by the antenna array of the Jth sector to K different directions.

Ideally, the sectors of the hybrid node are isolated from each other so that when the first sector is transmitting a signal through a transmission channel through one of the M beam settings, none (or very little) of the transmit signal of the first sector directly couples over to the second sector (or other sectors) while the second sector is receiving a signal through the transmission channel through one of the N beam settings. However, even if the first sector is perfectly isolated from the second sector, typically at least a portion of the transmission signal from the first sector is received by the second sector due to, for example, reflections of the transmission signal caused by reflectors 130, 132, leakage, and other coupling effects. That is, in the real-world, the beams that are formed are not perfectly directed to a target (for example, a receiving peer node), and obstacles exist that impede and at least partially redirect a portion of the transmission signal. Accordingly, at least a portion of the transmission signal is typically received by the second sector when the antenna array of the second sector is receiving a signal from another peer device or node. How much of the signal transmitted by the first sector and received by the second sector is dependent upon the environment the hybrid node is in, and how many reflectors are within the environment.

For improved efficiency of operation within a wireless mesh network, the hybrid node 110 is operable with at least one of the J sectors transmitting a communication signal to a peer node while at least one other sector of the hybrid node is receiving a communication signal from another peer node. Accordingly, while the hybrid node 110 is transmitting from one sector, at least some of that transmission signal typically is received by a different sector (such as, the second sector) while the different sector is receiving a signal from another device or peer node. Based on the uncontrolled real-world environment in which the hybrid nodes are deployed, due to real-world reflectors (such as, reflectors 130, 132) and other forms of leakage, varying amounts of transmit signals of the first sector are received by the second sector for the different M directions of the beam formed by the array of antennas of the first sector, and for the different N directions of the beam formed by the array of antennas of the second sector.

For at least some embodiments, the hybrid node 110 communicates with one or more of a first set peer nodes through the first sector through different settings of the array of antennas of the first sector, and communicates with one or more of a second set of peer nodes through the second sector through different settings of the array of antennas of the second sector. Note that the first set and the second set do not have to be exclusive. That is, the hybrid node may be able to communicate with a common peer node through both the first sector and the second sector.

Due to the varying real-world nature in which transmission signals of the first sector are coupled back to the second sector, transmission signals of different combinations of the M directions of the beam formed by the array of antennas of the first sector can be coupled (for example, due to reflections or leakage) differently for each of the N directions of the beam formed by array of antennas of the second sector. At least some embodiments of the hybrid node 110 are operative to characterize the hybrid node by measuring a signal quality received at the second sector for a plurality of the M settings of the beam directions of the array of antennas of the second sector, while transmitting a signal at each of a plurality of the N setting of the beam directions of the array of antennas of the first sector. That is as many as N×M signal quality measurements are made at the second sector. These signal quality measurements provide a representation of the amount of transmit signal of the first sector that is received by the second sector for each of the transmit beam forming and receive beam forming settings of the first and second sectors. That is, the received signal quality measurements provide a representation of the interference at a receiving sector of the hybrid node due to transmission of signals from a transmitting sector of the hybrid node.

For at least some embodiments, measuring the received signal quality includes measuring one or more of RSSI (received signal strength indicator), SINR (signal to interference and noise ratio), SIR (signal to interference ratio), CIR (channel impulse response), SNR (signal to noise ratio), a PER (packet error rate), BER (bit error rate), or throughput. For at least some embodiments, the received signal quality is measured by the transceiver that corresponds with the sector (for example, the second sector) of the hybrid node that is receiving the signal transmitted by the other sector (for example, first sector).

Each the J different sectors can similarly measure a receive signal quality at a plurality of receive beam forming settings while the first sector is transmitting over a plurality of transmit beam forming settings, thereby efficiently characterizing other sectors the hybrid node at the same time the second sector is being characterized.

For at least some embodiments, reciprocity of the transmission channel between the first sector and the second sector is assumed. That is, transmission signals from the second sector that are received at the first sector are assumed to approximately the same as transmission signals from the first sector that are received at the second sector. Accordingly, one or more of the receive signal quality measurements made at the second sector can be equally applied at the first sector.

Figure 2:
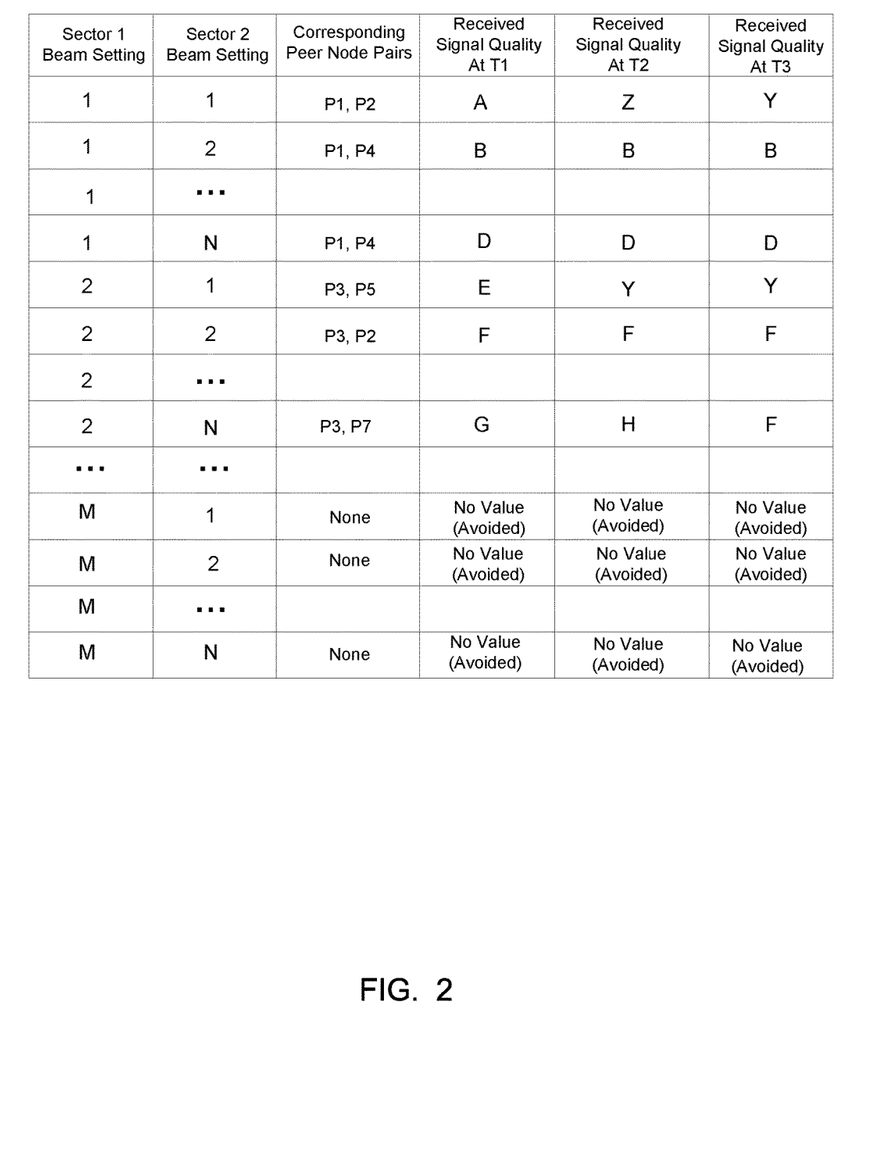
FIG. 2 shows a table that includes sector beam forming settings of the hybrid node and corresponding peer node pairs and receive signal qualities, according to an embodiment.

FIG. 2 shows a table of an example hybrid node that includes sector beam forming settings, and corresponding peer node pairs and received signal qualities, according to an embodiment. The first and second columns of the table list possible sector 1 beam settings and sector 2 beam settings. For an embodiment, during characterization of the hybrid node, the first sector (sector 1) is transmitting while the second sector (sector 2) is receiving. As shown, there are M possible transmit beam settings of the first sector. For a plurality of the M possible transmit beam settings of the first sector (sector 1) receive signal quality measurements are made for a plurality of the N possible receive beam settings of the second sector (sector 2). While there are N×M possible receive signal quality measurements, at least some embodiments include receive signal quality measurements at only a subset of the N×M possible measurements, which saves time and processing.

For an embodiment, at least a subset of the M transmit beam forming settings is used during characterization. For an embodiment, the subset is selected based on the existence of peer nodes with which the hybrid node can communicate. For example, while M transmit beam settings of the first sector may be possible, only a subset of the M transmit beam setting actually enable the formation of a micro-route with a peer node. Therefore, only the subset of the M transmit beam forming settings need be characterized. For example, as shown in the Table of FIG. 2, no peer node pairs correspond with the sector 1 transmit beam forming setting of M, and therefore, no receive signal quality measurements are made for the transmit beam forming setting M of the first sector. For an embodiment, a determination of new or different peer nodes may be used to trigger a re-characterization of the hybrid node.

Further, for an embodiment, at least a subset of the N transmit beam forming settings is used during characterization. For an embodiment, the subset is selected based on the existence of peer nodes with which the hybrid node can communicate. For example, while N receive beam settings of the first sector may be possible, only a subset of the N receive beam setting actually enable the formation of a micro-route with a peer node. Therefore, only the subset of the N receive beam forming settings need be characterized.

For an embodiment, a determination of new or different peer nodes may be used to trigger a re-characterization of the hybrid node.

For an embodiment, prior communication with peer nodes is used to determine whether a particular transmit beam forming setting or receive beam forming setting is included within the characterization of the hybrid node. For example, some communication can be determined to be so good (greater than a threshold) that re-characterization of the particular transmit beam forming setting or receive beam forming setting is not needed. That is, the signal quality of such communication is so good (greater than a signal quality threshold) that a re-characterization is not need. The same premise can hold for poor communication. That is, communication with a peer node or set of peer node is so bad (less than a signal quality threshold) that it is a waste of resources to even bother to characterize the particular transmit or receive beam forming settings.

The third column lists pairs of peer nodes that correspond with the transmit beam setting of the first sector, and the receive beam setting of the second sector. For example, the transmit beam setting (1) of the first sector may correspond with (that is, the selected beam direction forms a micro-route with) a peer node P1. That is, a micro-route is established between the hybrid node and the peer node P1 when the transmit beam setting (1) is selected, and the hybrid node is able to transmit (or receive) communication to the peer node P1. For at least some embodiments, a micro-route between the hybrid node and a peer node includes a line-of-sight (LOS) link. For at least some embodiments, the micro-route includes an indirect reflective link, wherein a reflector causes the micro-route to be indirect due to the reflective path of the propagation of electromagnetic signals through the micro-route. Further, selecting the receive beam setting 1 of the second sector may correspond with (that is, the selected beam direction forms a micro-route with) a peer node P2. That is, a micro-route is established between the hybrid node and the peer node P2 when the receive beam setting (1) is selected, and the hybrid node receives communication from the peer node P2.

Observation of the corresponding peer nodes of column 3 of the table of FIG. 2 suggests that multiple beam forming settings (transmit and receive) can correspond with the same peer node. That is, for at least some embodiment, a micro-route (that includes, for example, a LOS path and a reflective path) between the node and the same peer node can be established through multiple beam forming settings.

As previously noted, while the table of FIG. 2 suggest M transmit beam settings and N receive beam settings, control of the hybrid node can adaptively determine which transmit and receive beam form setting are to be used for measuring the receive signal quality. Accordingly, the number of beam forming settings, and the number of receive signal quality measurement can be adaptively adjusted.

For an embodiment, communication signal quality measurements are performed during communications (transmission and/or reception) with the peer nodes. These communication signal quality measurements can be used for selectively determining which of the transmit beam settings and receive beam settings are to be used during the signal quality measurements of the hybrid node. Further, the communication signal quality measurements can be used to adaptively determine when to characterize the hybrid node. For example, for an embodiment, if the signal quality of signals transmitted from or received at the hybrid node are varying greater than a threshold, then the hybrid node can be triggered to re-characterize itself because it is assumed that the environment around the hybrid node is changing enough that operation of the hybrid node would benefit from a re-characterization.

For an embodiment, the re-characterization of the hybrid node occurs periodically. For an embodiment, the re-characterization of the hybrid node occurs dynamically. For an embodiment, the dynamic re-characterization occurs dynamically based upon sensed changes in the environment surrounding the hybrid node. For an embodiment, the sensed change of the environment is determined by the transmit and receive signal qualities of communication signal with peer nodes being sensed to change greater than a threshold amount.

Columns 4, 5 and 6 of the table of FIG. 2 show signal quality measurements at different times. For at least some embodiments, monitoring of the signal quality measurements at different times can be used for determining how frequently or at what times the signal quality measurement should or should not be made. For example, if the hybrid node is in a static environment then the signal quality measurement may not be needed very often. If the hybrid node is in a dynamic environment, then the signal quality measurements may need to be made more frequently. Further, the time of day, week, month or year may further influence when the signal quality measurements should be made. That is, during a certain time of each day during the week, the environment of the hybrid node may be dynamic, but during other times the environment of the hybrid node may be relatively static. An embodiment includes performing new signal quality measurements for the transmit and the receive beam settings when changes to the environment of the hybrid node are determined to exceed a threshold (for example, wherein the signal quality of signals transmitted from or received at the hybrid node are varying greater than a threshold). Note that this can apply to particular transmit and receive beam settings. That is, the only a subset of the transmit and/or receive beam settings may exceed the threshold, and therefore, only a subset of the transmit and/or receive beam setting may need to be re-characterized (re-measured).

For at least some embodiments, prior receive signal quality measurements influence whether receive signal quality measurements of future characterization of the hybrid node of each of the different transmit and receive beam settings are made. The receive signal quality measurements at times T1, T2 and T3 can be used to determine whether later receive signal quality measurement should or should not be made. For example, the receive signal quality measurements for the sector 1 transmit beam setting of 1 and the sector 2 receive beam forming setting is different for each of the receive signal quality measurements and T1, T2, T3. This would suggest that the later characterization of the hybrid node should include this setting. In contrast, the receive signal quality measurements for the sector 1 transmit beam setting of 2 and the sector 2 receive beam forming setting is same for each of the receive signal quality measurements and T1, T2, T3. This would suggest that the later characterization of the hybrid node may not need to include this setting because the environment about the peer nodes that correspond with this setting is relatively static. Accordingly, for an embodiment, characterizations of the hybrid node are performed upon determining that variations of the received signal quality measurements over a plurality of measurements are greater than a threshold.

Figure 3:
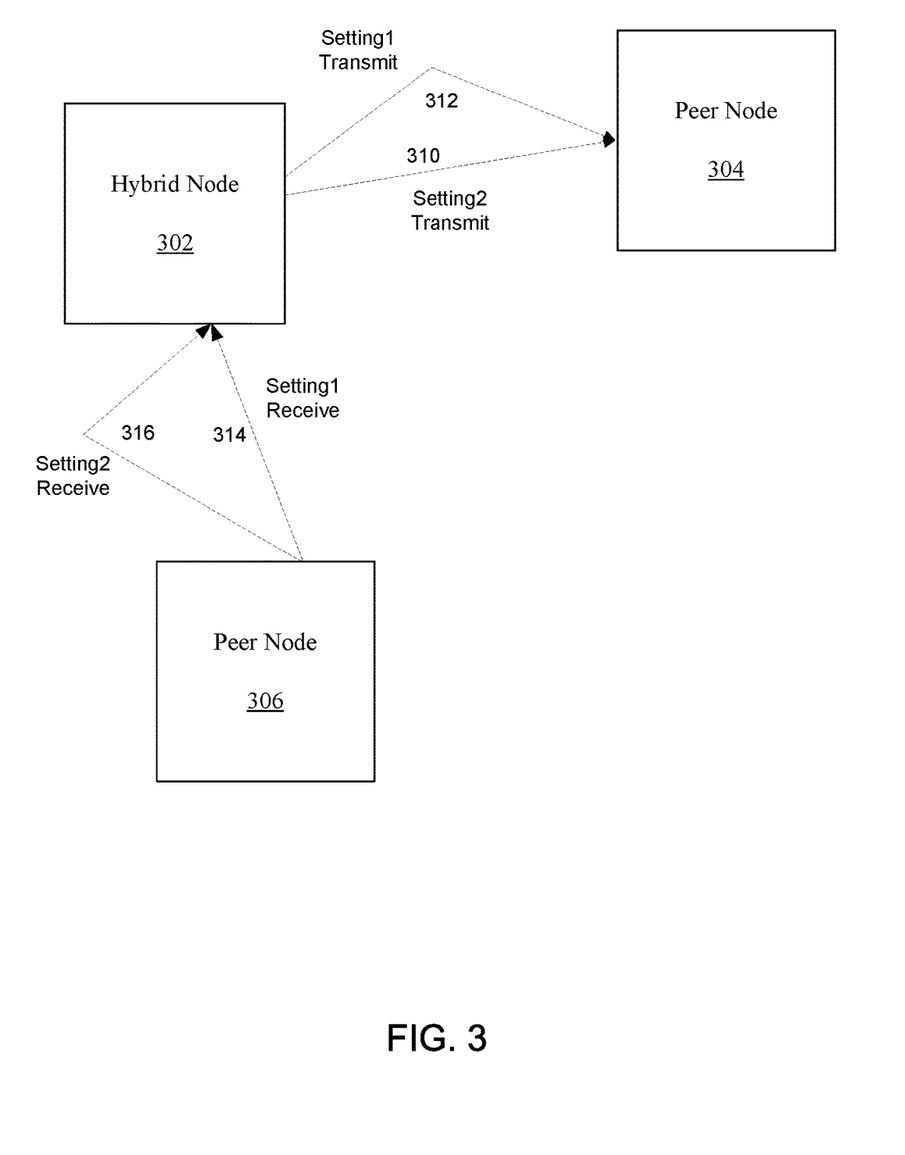
FIG. 3 shows a hybrid node and peer nodes, wherein multiple micro-links are formed between the hybrid node and the peer nodes, according to an embodiment.

FIG. 3 shows a hybrid node 302 and peer nodes 304, 306, where direct links and micro-links are formed between the hybrid node 302 and peer nodes 304, 306, according to an embodiment. As shown, a first transmit beam setting (for example, of the first sector of the hybrid node 302) and a second transmit beam setting both provide or allow for the formation of a link 310 or a micro-link 312 between the hybrid node 302 and the peer node 304. Further, as shown, a first receive beam setting (for example, of the second sector of the hybrid node 302) and a second receive beam setting both provide or allow for the formation of a link 316 or a micro-link 316 between the hybrid node 302 and the peer node 306. The changes in direction of the micro-route can be formed due to a signal reflector (such as, reflectors 130, 132) redirecting the path of the communication signal during transmission.

As was depicted by the table of FIG. 2, the measured signal quality of signals transmitted from the first sector of the hybrid node and received at the second sector hybrid node can vary depending upon the selected transmit beam setting and the selected receive beam setting. That is, some pairs of transmit beam settings and received beam setting are more or less desirable due to transmit signal energy of one sector coupling back (through, for example, signal path reflectors) to a different sector of the hybrid node. Accordingly, for an embodiment, which pair of transmit beam forming setting and receive beam forming setting to select while the hybrid node is simultaneously communicating with the peer node 304 and the peer node 306 is influenced by the corresponding previously measured received signal quality measurements.

For an embodiment, the pair of transmit beam forming setting and receive beam forming setting that has a best signal quality measurement is selected for the corresponding pair of peer nodes that the hybrid node is simultaneously communicating with. Other embodiments include avoiding pairs of transmit beam forming setting and receive beam forming setting that have a receive signal quality of less than a threshold.

Figure 4:
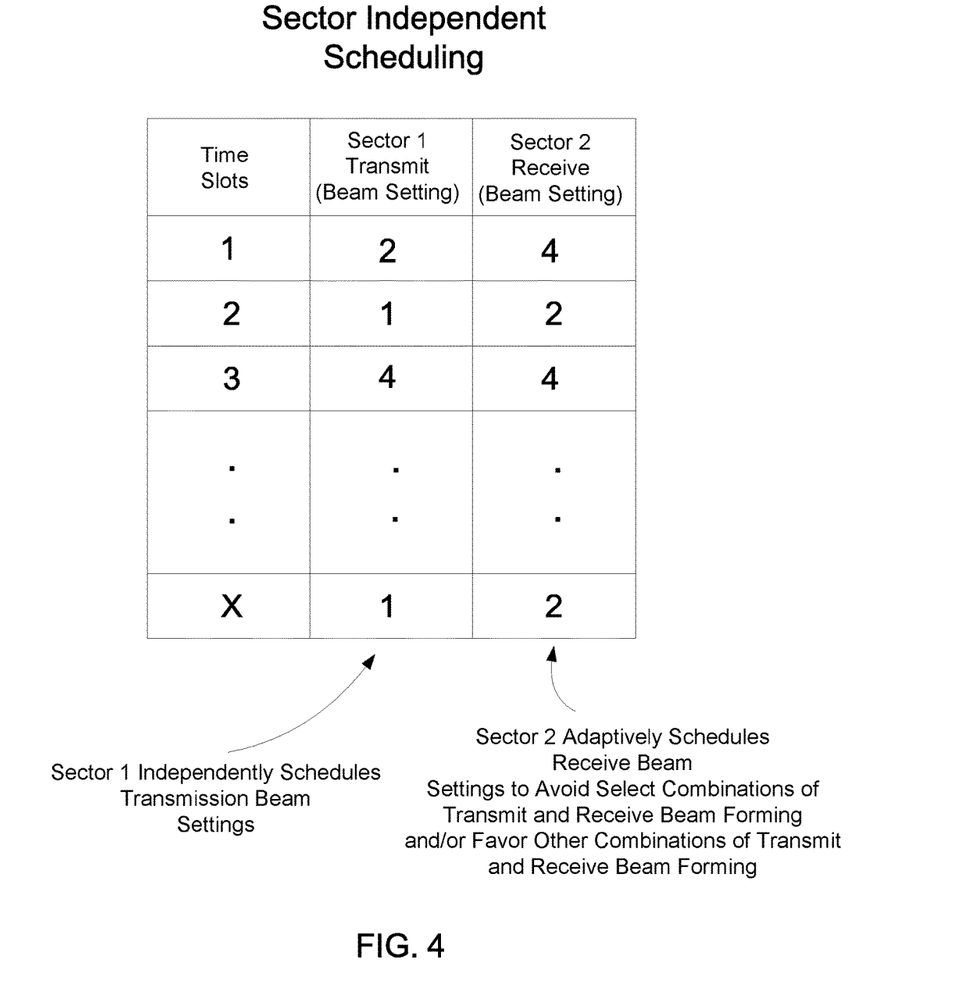
FIG. 4 shows a table that illustrates sector independent scheduling in order to avoid particular pairs of transmit beam forming settings and receive beam forming settings, according to an embodiment.

FIG. 4 shows a table that illustrates sector independent scheduling in order to avoid particular pairs of transmit beam forming settings and receive beam forming settings, according to an embodiment. As depicted by the first column of the table of FIG. 4, an exemplary schedule includes time slots 1, 2, 3 . . . X. For an embodiment, a first sector (Sector 1) of the hybrid node selects scheduling with a plurality of nodes during the time slots 1, 2, 3 . . . X of the schedule. For example, the selected schedule of the first sector can include a transmit beam forming setting of 2 for the first time slot (Time slot 1), a transmit beam forming setting of 1 for the second time slot (Time slot 2), a transmit beam forming setting of 4 for the third time slot (Slot 3), and transmit beam forming setting of 1 for the Xth time slot (Time slot X).

After the selection of the scheduling of the first sector of the hybrid node, a second sector of the hybrid node adaptively selects scheduling with other peer nodes. The formation of communication links between the hybrid node and the other peer nodes includes the selection of beam forming setting that allow for the formation of the communication links with the other peer nodes. For an embodiment, the adaptive scheduling of the second sector avoids simultaneous selection of particular pairs of transmit beam forming settings of the first sector and receive beam forming setting of the second sector based on the measured signal qualities. That is, for an embodiment, certain pairs of transmit beam forming setting and receive beam forming settings are avoided if the received signal quality measurements during characterization of the hybrid node are below a threshold. Accordingly, the second sector may adaptively select a receive beam forming setting of 4 for the first time slot (Time slot 1) because during characterization of the hybrid node, the transmit beam forming setting of 2 of the first sector and the receive beam forming setting of 4 of the second sector resulted in a receive signal quality measurement that was better than a predetermined or desire quality threshold. Other receive beam forming settings of the second sector may be avoided because the received signal quality measurement with the second sector at the other receive beam forming settings while the first sector was at the transmit beam forming setting of 2 was worse than the predetermined or desire quality threshold. Further, the second sector may adaptively select a receive beam forming setting of 2 for the second time slot (Time slot 2) because during characterization of the hybrid node, the transmit beam forming setting of 1 of the first sector and the receive beam forming setting of 2 of the second sector resulted in a receive signal quality measurement that was better than a predetermined or desire quality threshold. Further, the second sector may adaptively select a receive beam forming setting of 4 for the third time slot (Time slot 3) because during characterization of the hybrid node, the transmit beam forming setting of 4 of the first sector and the receive beam forming setting of 4 of the second sector resulted in a receive signal quality measurement that was better than a predetermined or desire quality threshold. Further, the second sector may adaptively select a receive beam forming setting of 2 for the Xth time slot (Time slot X) because during characterization of the hybrid node, the transmit beam forming setting of 1 of the first sector and the receive beam forming setting of 2 of the second sector resulted in a receive signal quality measurement that was better than a predetermined or desire quality threshold.

Figure 5:
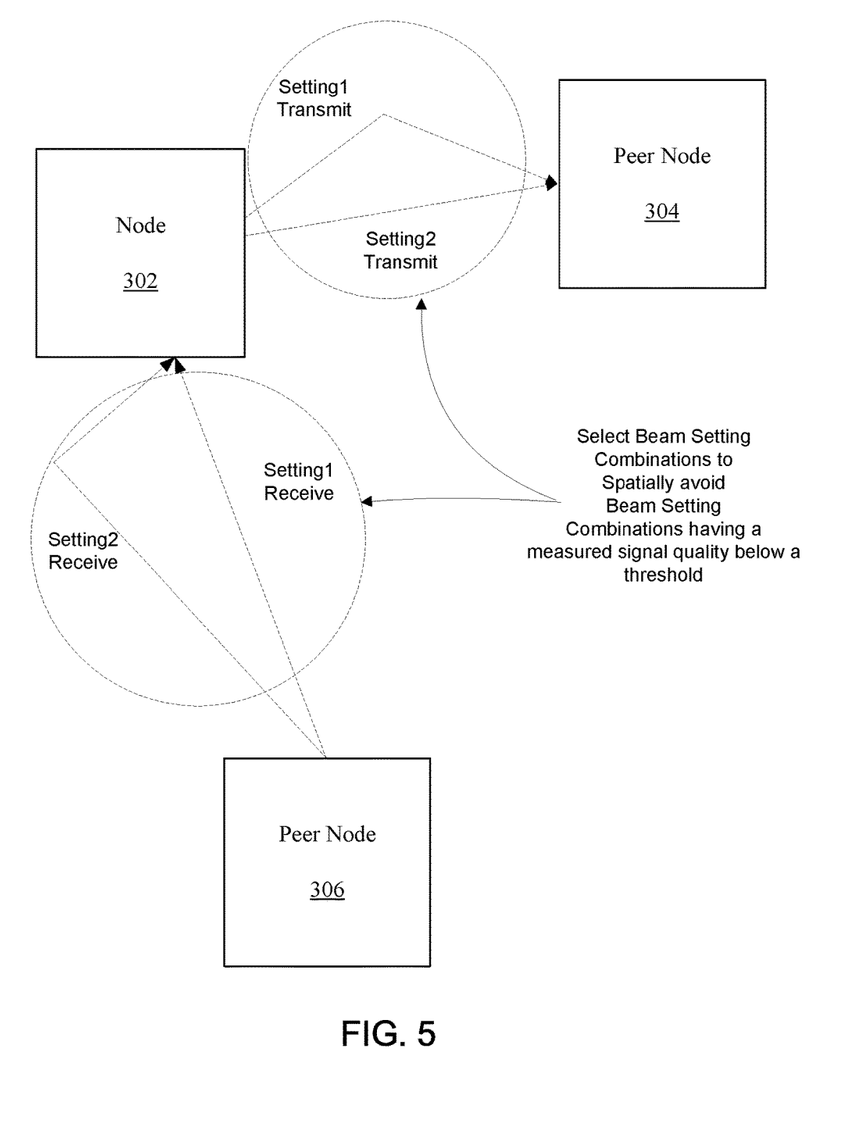
FIG. 5 shows a hybrid node that spatially selects links between the hybrid node and peer nodes to avoid particular pairs of transmit beam forming settings and receive beam forming settings, according to an embodiment.

FIG. 5 shows a hybrid node that spatially selects links between the hybrid node and peer nodes to avoid particular pairs of transmit beam forming settings and receive beam forming settings, according to an embodiment. As previously described, certain pairs of transmit beam forming settings of the first sector and receive beam forming settings of the second sector are avoided based on the measured receive signal quality.

Figure 6:
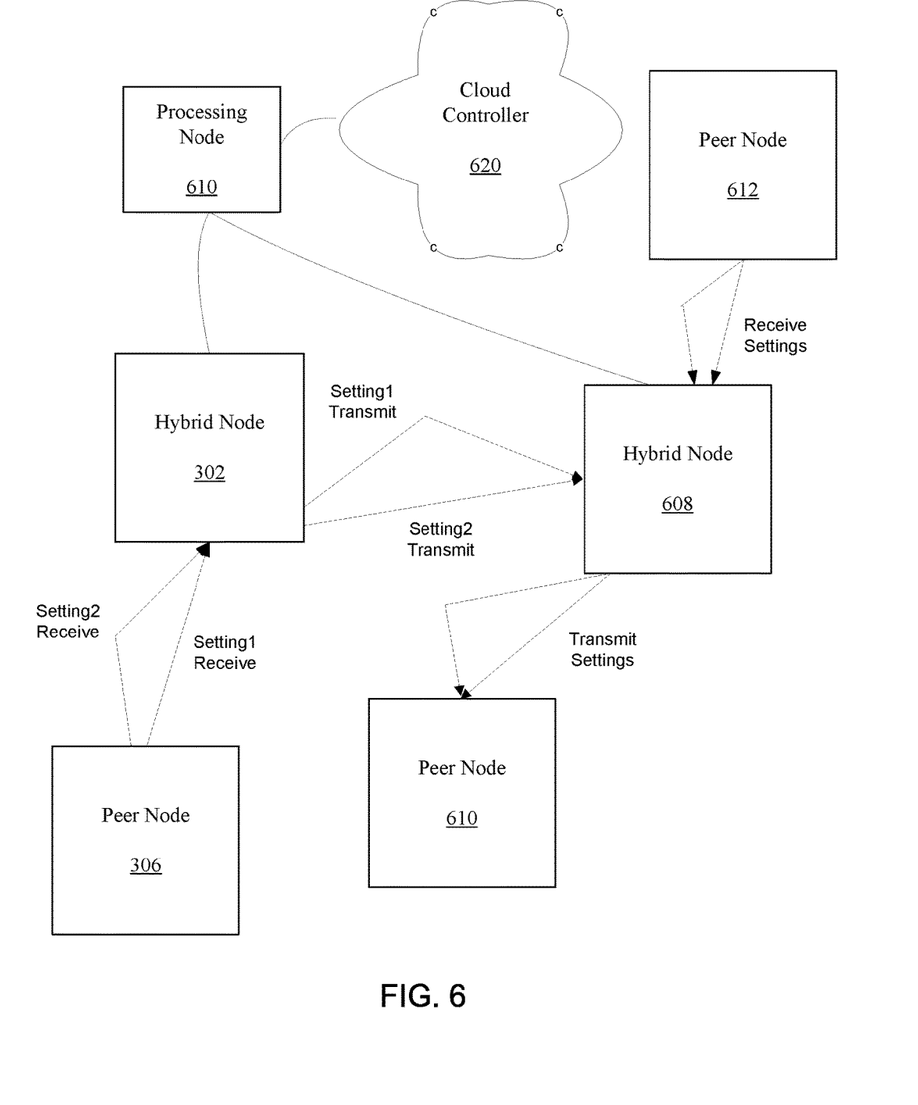
FIG. 6 shows a hybrid node and peer nodes, and further shows a processing node and a cloud network, according to an embodiment.

FIG. 6 shows a hybrid node and peer nodes, and further shows a processing node and a cloud network, according to an embodiment. For an embodiment, the signal quality measurements of the signal received at the second sector due to transmission of the signal through the first sector is performed at the hybrid node 302 itself. However, processes and methods for adaptively controlling operation of the hybrid node either before or after the signal quality measurements can be performed at the hybrid node 302, at a processing node 610, at an upstream network, such as cloud controller 620, or be distributed amongst any combination of the hybrid node 302, the processing node 610, or the cloud controller 620.

The upstream processing of either the processing node 610 or the cloud controller 620 can be particularly useful because these upstream controllers have access to multiple hybrid nodes 302, 608, and the associated peer nodes 306, 610, 612. As shown, another hybrid node 608 can also be a peer node of the hybrid node 302. The processing node 610 and the cloud controller 620 are connected (either directly or indirectly) to the hybrid nodes 302, 608 and have access to the received signal quality measurements of the characterizations of each of the hybrid nodes 302, 608.

For at least some embodiments, one or more hybrid nodes generate a table (or other form) of received signal quality measurements for the different transmit and receive beam forming settings, and then provides the received signal quality measurements to one or more of the upstream controllers (the processing node 610 or the cloud controller 612). For at least some embodiments, the one or more upstream controller select which of the transmit beam forming and receive beam forming settings are used during the characterization of one or more of the hybrid nodes 302, 608.

For at least some embodiment, the one or more of the upstream controllers determine which pairs of nodes interfere with each other at particular times, and accordingly select which transmit and receive beam forming to include or not include in the characterizations of the hybrid nodes 302, 608. Further, for at least some embodiments, the one or more upstream controllers compute probability of failure of communication between hybrid nodes and peer nodes based on the received signal quality measurements of the characterizations of the hybrid nodes. Further, for at least some embodiments, the one or more upstream controller select which of the transmit and receive beam settings one or more of the hybrid nodes 302, 608 use to communicate with peer nodes. Further, for at least some embodiments, the upstream controllers adjust or select modulation and coding schemes (MCS) of communication between hybrid nodes and peer nodes based on the received signal quality measurements of the characterizations of the hybrid nodes.

For at least some embodiment, the one or more of the upstream controllers are operative to select one or more pairs of transmit beam forming settings and receive beam forming settings to avoid based on the measured signal qualities. For at least some embodiment, the one or more of the upstream controller are operative to select which of the pair of transmit beam forming settings and receive beam forming settings to avoid based on the measured signal quality corresponding with each of the transmit beam forming settings and the receive beam forming settings. For at least some embodiment, the one or more of the upstream controllers are operative to monitor wireless communication of the access node with one or more peer access nodes, and preselecting or influencing the first plurality of beam forming settings based on the prior monitored wireless communication.

Figure 7:
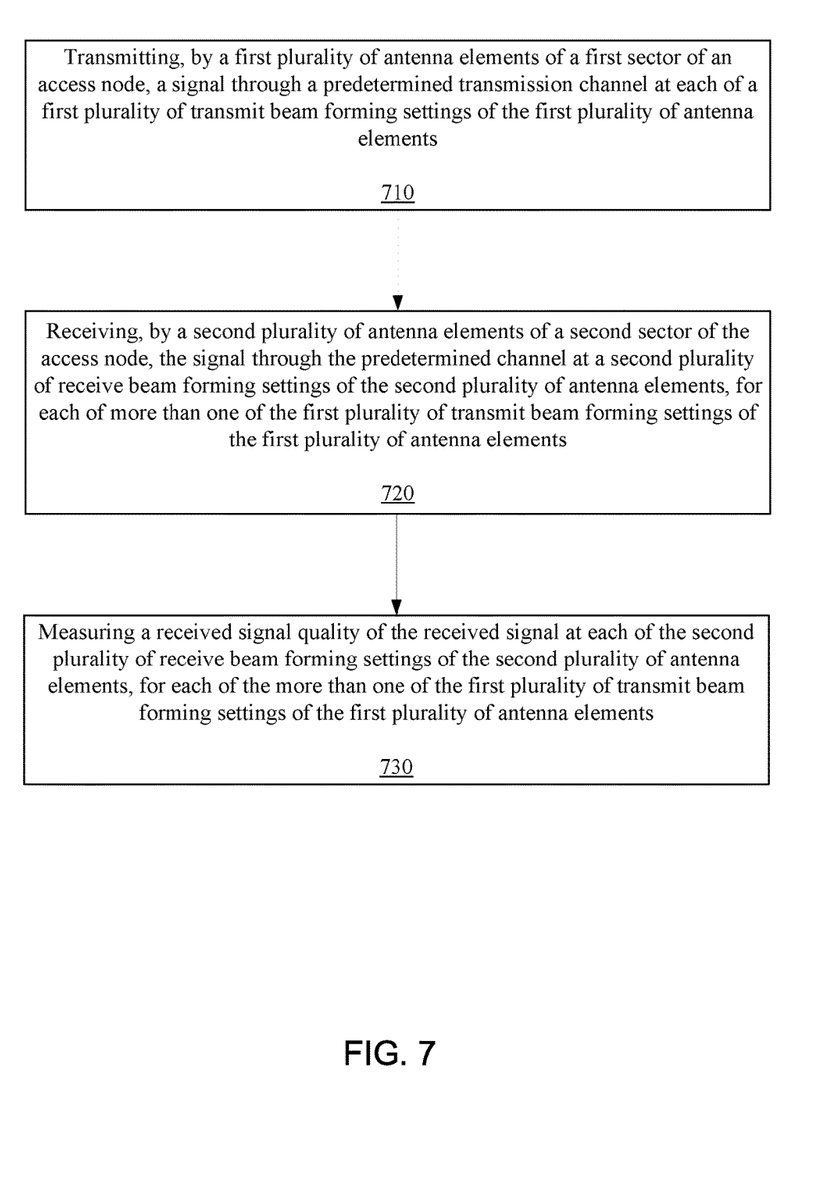
FIG. 7 is a flow chart that includes steps of a method of a hybrid node, according to an embodiment.

FIG. 7 is a flow chart that includes steps of a method of a hybrid node, according to an embodiment. A first step 710 includes transmitting, by a first plurality of antenna elements of a first sector of an access node, a signal through a predetermined transmission channel at each of a first plurality of transmit beam forming settings of the first plurality of antenna elements. A second step 720 includes receiving, by a second plurality of antenna elements of a second sector of the access node, the signal through the predetermined channel at a second plurality of receive beam forming settings of the second plurality of antenna elements, for each of more than one of the first plurality of transmit beam forming settings of the first plurality of antenna elements. A third step 730 includes measuring a received signal quality of the received signal at each of the second plurality of receive beam forming settings of the second plurality of antenna elements, for each of the more than one of the first plurality of transmit beam forming settings of the first plurality of antenna elements.

At least some embodiments storing the received signal quality or a representation of the received signal quality for each of the receive beam forming settings of each of the more than one of the first plurality of transmit beam forming settings. For at least some embodiments, the storing occurs at one or more of the hybrid node, an upstream processing node, or in the cloud.

For an embodiment, each of the first plurality of transmit beam forming settings corresponds to a transmit beam direction, and a corresponding peer node for at least one of the first plurality of transmit beam forming settings is identified based on a location of the peer node and the beam direction of the transmit beam forming setting. For an embodiment, links between the node and a plurality of corresponding peer nodes include direct links and micro-links.

For an embodiment, each of the second plurality of receive beam forming settings corresponds to a receive beam direction, and a corresponding peer node for each of the second plurality of receive beam forming settings is identified based on a location of the peer node and the beam direction of the receive beam forming setting. For an embodiment, links between the node and a plurality of corresponding peer nodes include direct links and micro-links.

For an embodiment, each of the first plurality of transmit beam forming settings corresponds to a transmit beam direction, and a corresponding peer node for each of the first plurality of transmit beam forming settings is identified based on a location of the peer node and the beam direction of the transmit beam forming setting, and wherein each of the second plurality of receive beam forming settings corresponds to a receive beam direction, and a corresponding peer node for each of the second plurality of receive beam forming settings is identified based on a location of the peer node and the beam direction of the receive beam forming setting. For an embodiment, each links between the node and a plurality of corresponding peer nodes include direct links and micro-links.

For an embodiment, pairs of neighboring nodes are identified based corresponding peer nodes for the first plurality of transmit beam forming settings and corresponding peer nodes for the second plurality of receive beam forming settings. An embodiment includes classifying each of the pairs of peer nodes based on one or more measured signal qualities of each pair of peer nodes for the pairs of transmit beam forming settings and receive beam forming settings. An embodiment includes selecting which of the pair of peer nodes to avoid based on the measured signal quality of the pair of peer nodes. For an embodiment, peer pairs are selected to avoid depending on the measured signal quality associated with the pair.

An embodiment includes selecting one or more pairs of transmit beam forming settings and receive beam forming settings to avoid based on the measured signal qualities. A pair of peer nodes may have multiple possible pairs of settings—one having a measured signal quality greater (better) than a threshold and another having a measured signal quality less than (worse) the threshold.

At least some embodiments include selecting which of the pair of transmit beam forming settings and receive beam forming settings to avoid based on the measured signal quality corresponding with each of the transmit beam forming settings and the receive beam forming settings.

Figure 8:
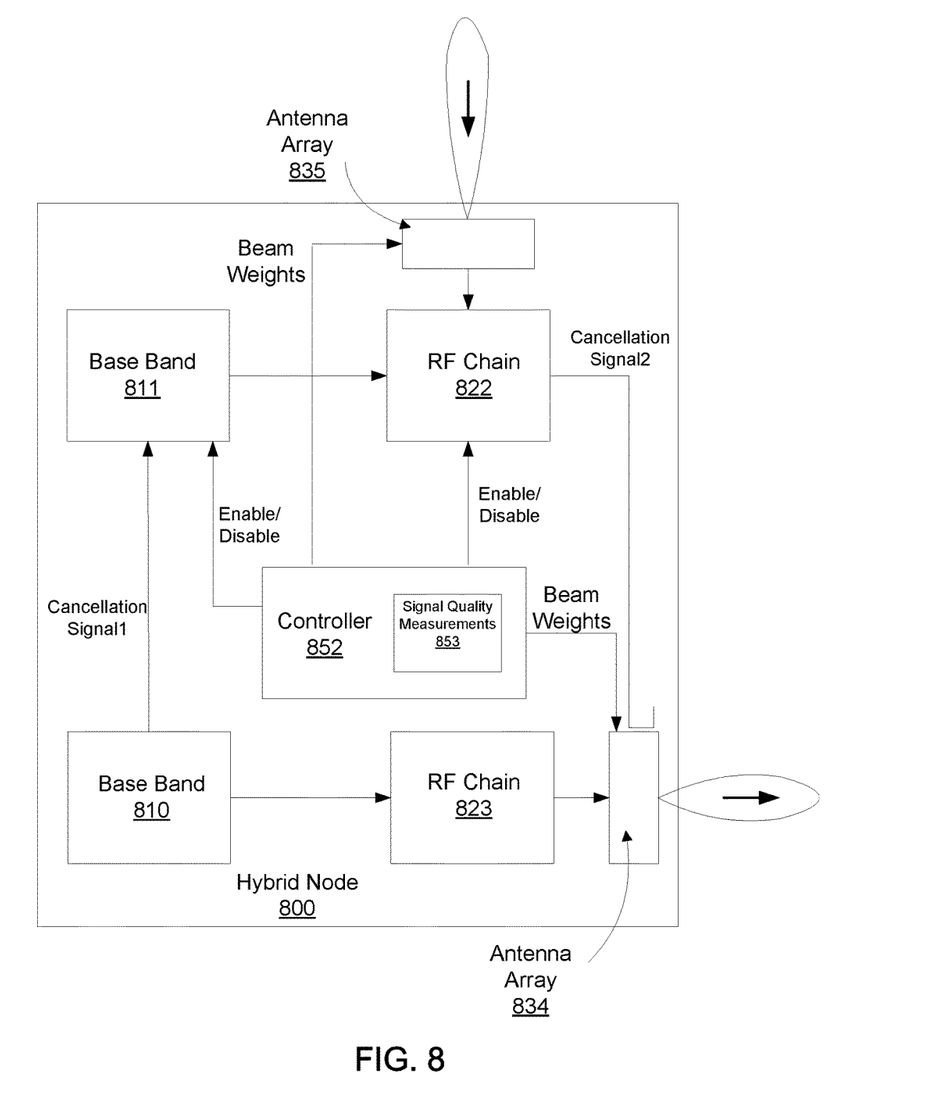
FIG. 8 is a block diagram of a hybrid node that includes interference cancellation signals, according to an embodiment.

FIG. 8 is a block diagram of a hybrid node 800 that includes interference cancellation signals, according to an embodiment. As shown, at least some embodiments include generating an interference cancellation signal (such as, interference cancelation signal 1 or interference cancelation signal 2) for at least one of pairs of transmit beam forming settings and receive beam forming settings, and summing the interference cancellation signal with a signal received while the access node is simultaneously communicating with a pair of peer nodes that correspond with the at least one of pairs of transmit beam forming settings and receive beam forming settings.

As shown, the hybrid node 800 includes a first sector that includes baseband processing 810, RF (radio frequency) chain 823, and an antenna array 834. The hybrid node 800 further includes a second sector that includes baseband processing 811, RF (radio frequency) chain 822, and an antenna array 835. For an embodiment, one or more interference cancellation signals (interference cancelation signal 1 and/or interference cancelation signal 2) are generated to at least partially cancel signals transmitted from the first sector that are coupled back into received signals of the second sector. That is, the interference cancellation signals are generated based on the transmit signal of the first sector at either the baseband processing 810 (for the cancellation signal 1) or at the antenna array 834 (for the cancellation signal 2). The interference cancellation signals are summed by the second sector at either the baseband processing 811 (for the cancellation signal 1) or at the RF chain 822.

For at least some embodiments, a controller 852 of the hybrid node generates one or more enable control signals (Enable/Disable) that enable or disable the interference cancellation signals (interference cancelation signal 1 and/or interference cancelation signal 2) base on the received signal quality measurements 853 determined during the characterization of the hybrid node 800. Further, for at least some embodiments, the received signal quality measurements include a channel impulse response, and the controller further aids the interference cancellation signals based on the channel impulse response.

At least some embodiments include monitoring wireless communication of the access node with one or more peer access nodes, and preselecting or influencing the first plurality of beam forming settings based on the prior monitored wireless communication. As previously stated, for at least some embodiments, prior receive signal quality measurement influence whether a receive signal quality measurements of future characterization of the hybrid node of each of the different transmit and receive beam setting are made. For example, if a receive signal quality measurement for a particular transmit and receive beam forming setting is consistently the same (within a threshold amount of each other), then fewer measurements are made over time. That is, the environment around the hybrid node is static, and fewer measurements can be made. If a receive signal quality measurement for a particular transmit and receive beam forming setting is consistently the changing (greater than a threshold amount of each other), then a greater number of measurements are made over time. That is, the environment around the hybrid node is dynamic, and a greater number of measurements can be made.

At least some embodiments include multiple sectors of the access node simultaneously receiving and measuring a received signal quality of a received signal at each of a plurality of receive beam forming settings, for each of the more than one of the first plurality of transmit beam forming settings of the first plurality of antenna elements. At least some embodiments include assuming reciprocity of the predetermined transmission channel between pairs of peer nodes, allowing a receive and transmit relationship between the access node and each peer node of the pairs of peer nodes to be reciprocal. This greatly reduces the number of receive signal quality measurements that need to be made.

At least some embodiments include adaptively scheduling communication with a peer node of at least one of the first sector or the second sector to adaptively avoid designated pairs of transmit beam forming settings and receive beam forming settings. That is, one sector adjusts its scheduling based on the schedule of the other sector to avoid certain pairs of transmit beam forming settings and receive beam forming settings of peer nodes.

For at least some embodiment, frequency avoidance is applied to micro-routes that correspond to pairs of transmit beam forming settings and receive beam forming settings of peer nodes that have a corresponding received signal quality measurement that is below a threshold. That is, communication links (micro-routes) that are formed using pairs of transmit beam forming settings and receive beam forming settings of peer nodes that have corresponding received signal qualities below a threshold are more likely to have poor quality links. The effects of the poor quality links can be mitigated by utilizing frequency avoidance techniques.

For at least some embodiment, link adaptation is applied to communication links that correspond to pairs of transmit beam forming settings and receive beam forming settings of peer nodes that have a corresponding the received signal quality measurement that is below a threshold. That is, communication links (micro-routes) that are formed using pairs of transmit beam forming settings and receive beam forming settings of peer nodes that have corresponding received signal qualities below a threshold are more likely to have poor quality links. The effects of the poor quality links can be mitigated by utilizing link adaptation techniques.

Although specific embodiments have been described and illustrated, the embodiments are not to be limited to the specific forms or arrangements of parts so described and illustrated. The described embodiments are to only be limited by the claims.

What is claimed:

1. A method, comprising:
   selecting, by a cloud controller, a first plurality of transmit beam forming settings of a first plurality of antenna elements of a first sector of an access node;
   selecting, by the cloud controller, a second plurality of receive beam forming settings of a second plurality of antenna elements of a second sector of the access node;
   characterizing the access node, by the cloud controller, comprising the cloud controller instructing the access node to:
      transmit, by the first plurality of antenna elements of the first sector of the access node, a signal through a predetermined transmission channel at each of the first plurality of transmit beam forming settings of the first plurality of antenna elements; and
      receive, by the second plurality of antenna elements of the second sector of the access node, the signal through the predetermined channel at the second plurality of receive beam forming settings of the second plurality of antenna elements, for each of more than one of the first plurality of transmit beam forming settings of the first plurality of antenna elements.

2. The method of claim 1, wherein characterizing the access node further comprises:
   measuring a received signal quality of the received signal at each of the second plurality of receive beam forming settings of the second plurality of antenna elements, for each of the more than one of the first plurality of transmit beam forming settings of the first plurality of antenna elements.

3. The method of claim 1, further comprising controlling, by the cloud controller, a transmission and reception of a plurality of hybrid nodes, wherein the plurality of hybrid nodes including the access node.

4. The method of claim 3, further comprising determining, by the cloud controller, which pairs of the plurality of hybrid nodes interfere with each other at particular times, and selecting which transmit and receive beam forming settings to include or not include in characterizations of the plurality of hybrid nodes based on a determined interference.

5. The method of claim 3, further comprising selecting, by the cloud controller, coding schemes of communication between the plurality of hybrid nodes and peer nodes based on signal quality measurements of characterizations of the plurality of hybrid nodes.

6. The method of claim 1, wherein each of the first plurality of transmit beam forming settings corresponds to a transmit beam direction, and a corresponding peer node for each of the first plurality of transmit beam forming settings is identified based on a location of the peer node and the beam direction of the transmit beam forming setting, and wherein each of the second plurality of receive beam forming settings corresponds to a receive beam direction, and a corresponding peer node for each of the second plurality of receive beam forming settings is identified based on a location of the peer node and the beam direction of the receive beam forming setting.

7. The method of claim 3, further comprising selecting one or more pairs of transmit beam forming settings and receive beam forming settings to avoid based on the measured signal qualities.

8. The method of claim 7, further comprising selecting which of the pair of transmit beam forming settings and receive beam forming settings to avoid based on the measured signal quality corresponding with each of the transmit beam forming settings and the receive beam forming settings.

9. The method of claim 2, further comprising generating an interference cancellation signal for at least one of pairs of transmit beam forming settings and receive beam forming settings, and summing the interference cancellation signal with a signal received while the access node is simultaneously communicating with a pair of peer nodes that correspond with the at least one of pairs of transmit beam forming settings and receive beam forming settings.

10. The method of claim 2, further comprising monitoring wireless communication of the access node with one or more peer access nodes, and preselecting or influencing the first plurality of beam forming settings based on the prior monitored wireless communication.

11. The method of claim 2, further comprising multiple sectors of the access node simultaneously receiving and measuring a received signal quality of a received signal at each of a plurality of receive beam forming settings, for each of the more than one of the first plurality of transmit beam forming settings of the first plurality of antenna elements.

12. The method of claim 11, further comprising assuming reciprocity of the predetermined transmission channel between pairs of peer nodes, allowing a receive and transmit relationship between the access node and each peer node of the pairs of peer nodes to be reciprocal.

13. The method of claim 1, further comprising adaptively scheduling communication with a peer node of at least one of the first sector or the second sector to adaptively avoid designated pairs of transmit beam forming settings and receive beam forming settings.

14. A system, comprising:
a cloud controller;
an access node;
wherein the cloud controller operates to:
select a first plurality of transmit beam forming settings of a first plurality of antenna elements of a first sector of the access node;
select a second plurality of receive beam forming settings of a second plurality of antenna elements of a second sector of the access node;
characterize the node, comprising the cloud controller instructing the node to:
transmit, by the first plurality of antenna elements of the first sector of the access node, a signal through a predetermined transmission channel at each of the first plurality of transmit beam forming settings of the first plurality of antenna elements; and
receive, by the second plurality of antenna elements of the second sector of the access node, the signal through the predetermined channel at the second plurality of receive beam forming settings of the second plurality of antenna elements, for each of more than one of the first plurality of transmit beam forming settings of the first plurality of antenna elements.

15. The system of claim 14, wherein characterizing the node further comprises the access node operating to measure a received signal quality of the received signal at each of the second plurality of receive beam forming settings of the second plurality of antenna elements, for each of the more than one of the first plurality of transmit beam forming settings of the first plurality of antenna elements.

16. The system of claim 14, wherein the cloud controller further operates to control a transmission and reception of a plurality of hybrid nodes.

17. The system of claim 16, wherein the cloud controller further operates to determine which pairs of plurality of hybrid nodes interfere with each other at particular times, and selecting which transmit and receive beam forming settings to include or not include in characterizations of the plurality of hybrid nodes based on a determined interference.

18. The system of claim 16, wherein the cloud controller further operates to select coding schemes of communication between the plurality of hybrid nodes and peer nodes based on signal quality measurements of characterizations of the plurality of hybrid nodes.

19. The system of claim 16, wherein the cloud controller further operates to select one or more pairs of transmit beam forming settings and receive beam forming settings to avoid based on signal quality measurements of characterizations of the plurality of hybrid nodes.

20. The system of claim 14, wherein each of the first plurality of transmit beam forming settings corresponds to a transmit beam direction, and a corresponding peer node for each of the first plurality of transmit beam forming settings is identified based on a location of the peer node and the beam direction of the transmit beam forming setting, and wherein each of the second plurality of receive beam forming settings corresponds to a receive beam direction, and a corresponding peer node for each of the second plurality of receive beam forming settings is identified based on a location of the peer node and the beam direction of the receive beam forming setting.

* * * * *